United States Patent [19]
Mantell

[11] Patent Number: 5,847,724
[45] Date of Patent: Dec. 8, 1998

[54] METHOD FOR DIFFUSING ERRORS ACCORDING TO SPOT SIZE IN A PRINTED LIQUID INK IMAGE

[75] Inventor: David A. Mantell, Rochester, N.Y.

[73] Assignee: Xerox Corporation, Stamford, Conn.

[21] Appl. No.: 580,214

[22] Filed: Dec. 28, 1995

[51] Int. Cl.[6] .................................................. B41J 2/01
[52] U.S. Cl. ............................................. 347/15; 358/456
[58] Field of Search ................................. 347/15, 19, 43; 358/298, 456, 534

[56] References Cited

U.S. PATENT DOCUMENTS

| | | | |
|---|---|---|---|
| 4,680,645 | 7/1987 | Dispoto et al. | 358/298 |
| 5,045,952 | 9/1991 | Eschbach | 358/447 |
| 5,140,432 | 8/1992 | Chan | 358/298 |
| 5,321,525 | 6/1994 | Hains | 358/456 |
| 5,343,231 | 8/1994 | Suzuki | 347/14 |
| 5,375,002 | 12/1994 | Kim et al. | 358/521 |
| 5,422,664 | 6/1995 | Stephany | 347/14 |
| 5,434,672 | 7/1995 | McGuire | 358/296 |
| 5,521,620 | 5/1996 | Becerra et al. | 347/14 |
| 5,535,019 | 7/1996 | Eschbach | 358/456 |

OTHER PUBLICATIONS

Knox et al., "Threshold Modulation In Error Diffusion", *Journal of Electronic Imaging,* Jul. 1993, pp. 185–192.

*Primary Examiner*—Joseph Hartary
*Assistant Examiner*—Craig A. Hallacher

[57] ABSTRACT

A method of printing an input digital gray-scale image by ejecting ink on recording medium through a plurality of ink ejecting orifices to form a binary image including a plurality of spots. The method of printing includes the steps of determining an ink spot characteristic or ink ejecting characteristic for at least one of the plurality of ink ejecting orifices, calculating a correction factor based on the characteristic, modifying an error diffusion algorithm with the calculated correction factor, and printing the binary image according to the modified error diffusion algorithm on the recording medium.

10 Claims, 4 Drawing Sheets

METHOD FOR DIFFUSING ERRORS ACCORDING TO SPOT SIZE IN A PRINTED LIQUID INK IMAGE

FIELD OF THE INVENTION

This invention relates generally to a liquid ink image printed by a liquid ink printer and more particularly to a method for diffusing errors according to spot size in a printed liquid ink image.

BACKGROUND OF THE INVENTION

Liquid ink printers of the type frequently referred to as continuous stream or as drop-on-demand, such as piezoelectric, acoustic, phase change wax-based, or thermal, have at least one printhead from which droplets of ink are directed towards a recording medium. Within the printhead, the ink is contained in a plurality of ink carrying conduits or channels. Power pulses cause the droplets of ink to be expelled as required from orifices or nozzles at the ends of the channels.

In a thermal ink-jet printer, the power pulse is usually produced by a heater transducer or a resistor, typically associated with one of the channels. Each resistor is individually addressable to heat and vaporize ink in the channels. As voltage is applied across a selected resistor, a vapor bubble grows in the associated channel and initially bulges toward the channel orifice followed by collapse of the bubble. The ink within the channel then retracts and separates from the bulging ink thereby forming a droplet moving in a direction away from the channel orifice and towards the recording medium whereupon hitting the recording medium a dot or spot of ink is deposited. The channel is then refilled by capillary action, which, in turn, draws ink from a supply container of liquid ink.

The ink jet printhead may be incorporated into either a carriage type printer, a partial width array type printer, or a page-width type printer. The carriage type printer typically has a relatively small printhead containing the ink channels and nozzles. The printhead can be sealingly attached to a disposable ink supply cartridge and the combined printhead and cartridge assembly is attached to a carriage which is reciprocated to print one swath of information (equal to the length of a column of nozzles), at a time, on a stationary recording medium, such as paper or a transparency. After the swath is printed, the paper is stepped a distance equal to the height of the printed swath or a portion thereof, so that the next printed swath is contiguous or overlapping therewith. This procedure is repeated until the entire page is printed. In contrast, the page width printer includes a stationary printhead having a length sufficient to print across the width or length of a sheet of recording medium at a time. The recording medium is continually moved past the page width printhead in a direction substantially normal to the printhead length and at a constant or varying speed during the printing process. A page width ink-jet printer is described, for instance, in U.S. Pat. No. 5,192,959.

Printers typically print color and/or monochrome images received from an image output device or document creator such as a personal computer, a scanner, or a workstation. The color images printed are produced by printing with several colored inks or colorants of different colors at a time. The color of the ink and amount of ink deposited by the printer is determined according to image information received from the document creator. The document creator provides an input digital gray-scale image, which is either defined in monochromatic terms, colorimetric terms, or both. The amount of gray level is typically defined by an input pixel value ranging from 0 to 255, where 0 is equal to white, 255 is equal to black, and value therebetween are shades of gray. Commonly this description may be part of a Page Description Language (PDL) file describing the document. In the case of computer generated images, colors defined by the user at the user interface of a workstation can be defined initially in color space of tristimulus values. These colors are defined independently of any particular device, and accordingly reference is made to the information as being "device independent".

The printer, on the other hand, has an output which is dependent on the device or "device dependent". This dependency is due, in part, to the fact that while the input digital gray scale image includes pixels having a wide range of gray scale values, the output image generated by the printer is a binary image formed from a plurality of ink drops or spots wherein the absence of a spot defines the level of white and the presence of a spot defines black. Consequently, a transformation must be made from the input digital gray scale image to the printed binary image since the binary image includes binary information which either has a gray level value of zero (white) or one (black), but not levels of gray therebetween. These transformations, from an input image to an output image, are made with a number of known algorithms, including an algorithm known as the error diffusion algorithm which converts the input gray scale image into high frequency binary texture patterns that contain the same average grayscale information as the input image.

Color printers also include an output which can be defined as existing in a color space called CMYK (cyan-magenta-yellow-key or black) which is uniquely defined for the printer by its capabilities and colorants. Such printers operate by the addition of overlapping multiple layers of ink or colorant in layers to a page. The response of the printer tends to be relatively non-linear. These colors are defined for a particular device, and accordingly reference is made to the information as being device dependent. Thus, while a printer receives information in a device independent color space, it must convert that information to print in a device dependent color space, which reflects a possible range of colors of the printer; and secondly, printing of that image with a color printer in accordance with the colors defined by the scanner or computer generated image.

Various printers and methods for printing images on a recording medium are illustrated and described in the following disclosures which may be relevant to certain aspects of the present invention.

In U.S. Pat. No. 4,680,645 to Dispoto et al., a method for rendering gray scale images with variable dot sizes is described. An error diffusion algorithm is used in conjunction with a printing technique that is capable of producing a range of dot sizes on paper. The error diffusion algorithm is used to determine the error of a dot whenever the dot is printed. The error is then diffused to adjacent pixels where instead of being used for weighting the pixel in a thresholding process, the error is used to determine the proper dot size for the pixel.

U.S. Pat. No. 5,045,952 to Eschbach describes a method of dynamically adjusting the threshold level of an error diffusion algorithm to selectively control the amount of edge enhancement introduced into an encoded output. The threshold level is selectively modified on a pixel by pixel basis.

U.S. Pat. No. 5,343,231 to Suzuki describes an image recording apparatus capable of correcting density unevenness. A test pattern is recorded and the degree of density unevenness of the recording elements of the recording head are calculated by reading the test pattern. The temperature of the recording head is detected and the degree of calculated density unevenness is corrected according to the detected temperature.

U.S. Pat. No. 5,375,002 to Kim et al. describes an error diffusion circuit and a method for adaptively compensating for the distortion of brightness and color with respect to neighboring pixels. An error diffusion circuit includes a color determining portion for adding CMY signals to a diffusion error to generate a current pixel value, comparing the current pixel value with sequentially supplied error lookup data to determine an address of error lookup data having the smallest error as output pixel color information, and applying the output pixel color information to the printer.

U.S. Pat. No. 5,434,672 to McGuire, describes a pixel error diffusion method. Error distribution in printing and information processing systems is accomplished according to combined internal and external superpixel error diffusion techniques. For a particular superpixel, error amounts of a selected internal subject pixel are provided to another internal subject pixel until a determined or selected final pixel error value within the selected superpixel has been determined. The final internal error value is distributed among selected superpixels within a predetermined superpixel neighborhood "Threshold Modulation In Error Diffusion" by Knox and Eschbach, Journal of Electronic Imaging, July 1993, Vol. 2, Pages 185 to 192, describes a theoretical analysis of threshold modulation in error diffusion. Spatial modulation of the threshold is shown to be mathematically identical to processing an equivalent input image with a standard error diffusion algorithm.

SUMMARY OF THE INVENTION

In accordance with one aspect of the present invention, there is provided a method of printing an input digital gray-scale image by forming a plurality of spots on a recording medium. The method includes the steps of determining a spot characteristic for one of the plurality of spots, modifying an error diffusion algorithm as a function of the determined spot characteristic, converting the input digital gray scale image to a binary image according to the modified error diffusion algorithm, and printing the image on the recording medium.

Pursuant to another aspect of the present invention, there is provided a method of printing an input digital gray-scale image with a liquid ink printhead including a plurality of printhead dies by forming a plurality of ink spots on a recording medium. The method includes the steps of determining a characteristic signature for a selected one of the plurality of printhead dies representative of the formed ink spots, modifying an error diffusion algorithm as a function of the determined characteristic signature, converting the input digital gray scale image to a binary image according to the modified error diffusion algorithm, and printing the image on the recording medium with the selected one of the plurality of printhead dies.

In accordance with another aspect of the present invention, there is provided a method of printing an input digital gray-scale image by forming a plurality of spots on a recording medium with a printing device. The method includes the steps of determining a correction factor for a selected one of the plurality of spots, modifying an error diffusion algorithm as a function of the determined correction factor, converting the input digital gray scale image to a binary image according to the modified error diffusion algorithm and printing the image on the recording medium.

While the present invention will be described in connection with a preferred embodiment thereof, it will be understood that it is not intended to limit the invention to that embodiment. On the contrary, it is intended to cover all alternatives, modifications, and equivalents as may be included within the spirit and scope of the invention as defined by the appended claims.

DETAILED DESCRIPTION OF THE INVENTION

Figure 1:
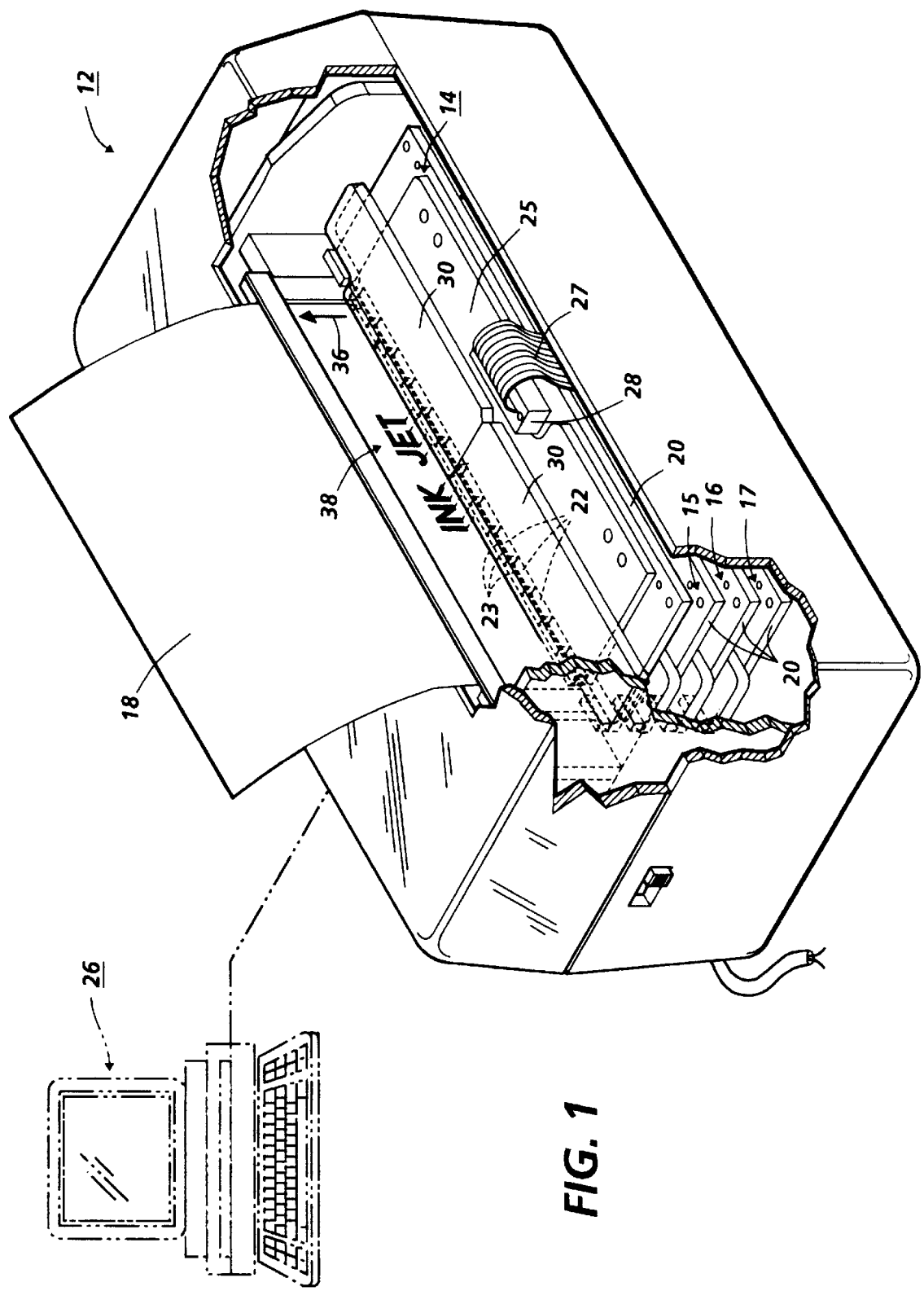
FIG. 1 is a partial perspective view of a multicolor, full width array liquid ink printer.

In FIG. 1, a multicolor ink jet printer 12 is illustrated with four identical full width array printheads 14,15,16, and 17, disposed therein to produce printed output or images on a recording medium, such as sheet 18. The printheads each comprise a structurally supporting substrate 20 which also functions as a heat sink and may optionally be cooled by the passage of a liquid coolant, such as water, through internal flow paths (not shown). An array of printhead subunits or printhead dies 22 are affixed on the supporting substrate 20 in an abutted fashion, as taught by U.S. Pat. No. 5,198,054 to Drake et al. and incorporated herein by reference. Alternatively, individual subunits 22 may be spaced apart from one another by a distance approximately equal to the length of a single subunit and bonded to each opposing surface of a supporting substrate 20, the subunits on one surface being staggered from the subunits on the other surface of the supporting substrate. In one embodiment, subunits 22 may be similar in construction to U.S. Pat. No. 4,774,530 to Hawkins, the relevant portions of which are hereby incorporated by reference. The forward facing edges of the subunits contain the droplet ejecting nozzles 23 and are referred to as printhead subunit faces. The subunit faces are maintained in close proximity to the surface of recording medium or sheet 18. Also affixed to substrate 20, at a position behind the abutted subunit array, is printed wiring board 26. Printed wiring board 26 contains the circuitry required to interface and drive the individual heating elements (not shown) in the subunits to eject ink droplets from the nozzles 23. The data required to drive the individual heating elements of the printhead subunits is supplied from an external system, such as a personal computer 26 by a standard printer interface, modified and/or buffered by a printer micro processor (not shown) within the printer and transferred to the printheads 14,15,16, and 17 by ribbon cables 27, only one of which is shown, and pin-type connector 28.

Ink is supplied to the individual subunit nozzles 23 through ink channels (not shown) which connect the nozzles to subunit ink reservoirs (not shown). The subunit reservoirs have inlets which are aligned and sealed with outlets in ink manifolds. Further description of such an arrangement may be found in U.S. Pat. No. 4,929,324 to Drake et al., the relevant portions of which are hereby incorporated by reference. Ink is supplied to the manifold inlet connectors to which flexible hoses (not shown) connect an ink supply (not shown) located within the printer 12. The location of full width array printbars 14,15,16, and 17 is particularly important in order to accurately position the nozzles of abutted printhead subunits 22, comprising each full width array printbar, because multicolor printing requires accurate placement of the ink droplets from each printbar relative to one another in order to place one ink droplet on or adjacent to a previously ejected droplet on the recording medium 18, thereby achieving the desired final colored image.

As further illustrated in FIG. 1, recording medium 18 is fed in the direction of arrow 36 as ink droplets are ejected from the nozzles 23 to produce output images 38 including drops or spots of ink deposited thereon. The paper is fed by conventional paper feeding mechanisms (not shown) and is maintained in close proximity to the subunit face of the subunits 22 making up the various full width array printbars by one or more paper guides which may contain several idler star wheels therein. The spacing between the front faces, which are all coplanar with one another, and the surface of the recording medium 18, is important to control the position of the ink droplets ejected from the individual nozzles. Furthermore, the spacing between the parallel and adjacent full width array printbars 14,15,16, and 17 must be maintained as close as possible and within very close tolerances.

While the spacing between the front face of the printhead dies and the recording medium is maintained to a fairly close tolerance, the amount of ink deposited to form a spot on the recording medium does not always meet a designed-for nominal spot size (often measured as a diameter although spots are typically not truly circular). This variation in spot size results from a variety of factors which can include variations in the physical dimensions of the ink carrying conduits and the ink ejecting orifices, the flow of ink from the ink reservoirs to the ink carrying conduits, as well as the flow of ink therethrough. In addition, the thermal energy generated by the transducers can also vary resulting in a spot sizes different than the nominal size desired.

It has been found that printheads that generate out of specification sized drops can produce printed images which do not have the appropriate contrast or color. While such a variation in drop size may not produce an undesirable image when printing in a low resolution draft mode, such a variation in drop size can be fatal to the production of printed images where either high quality or high resolution images are desired. In addition, it has been found that for a full width array printhead, spot size variations within a single printhead die may not be objectionable, but significant spot size variations from printhead die to printhead die can occur. This is especially undesirable since the eyes are very sensitive to differences in gray levels and color variations at the particular scale size of the individual printhead dies used to make a full width array printbar. While such printhead die variations can be controlled by testing and proper mating of like printhead dies, the cost can be prohibitive. Consequently, a method and apparatus is desired to account for spot size variation in a liquid ink printer.

Figure 2:
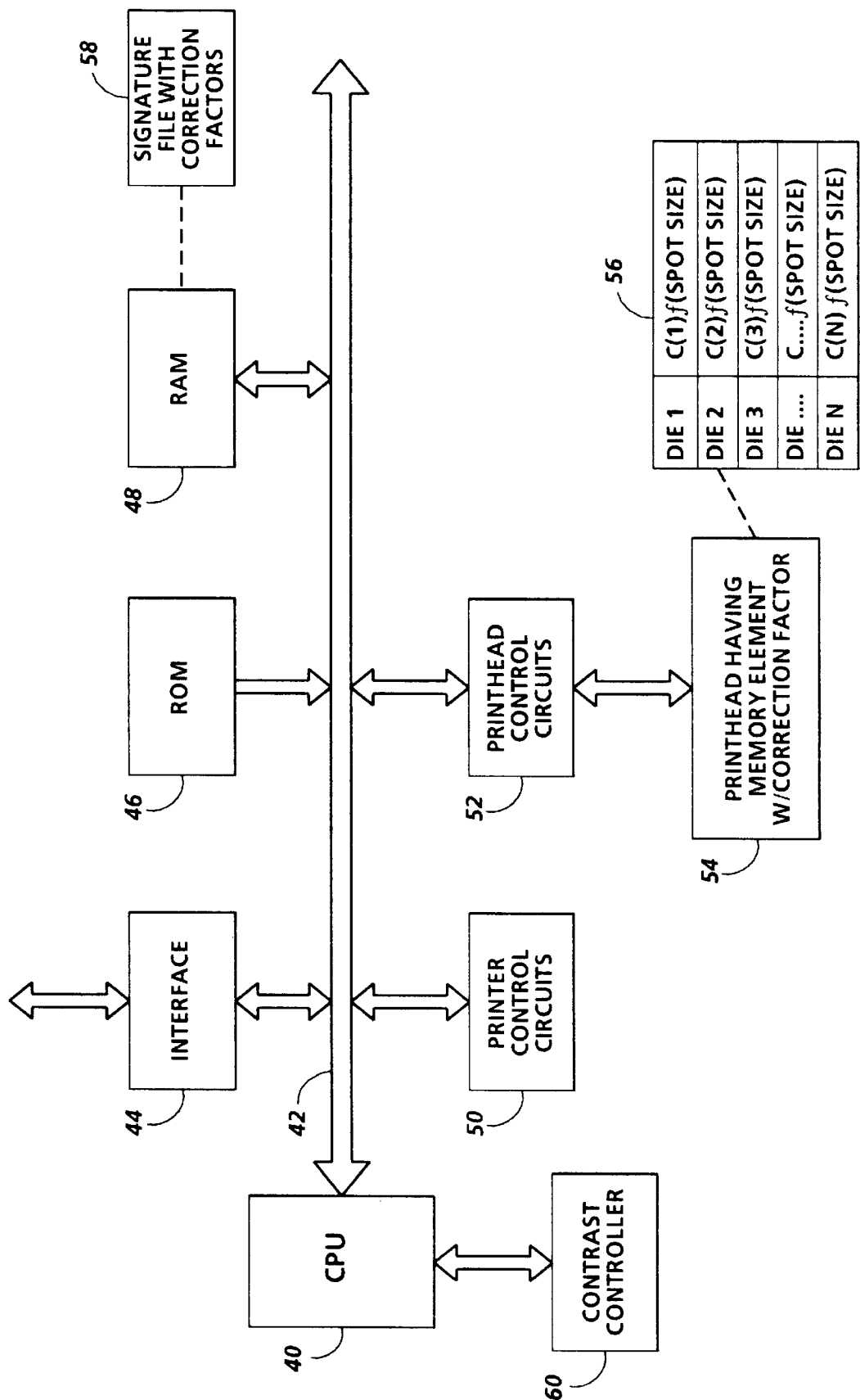
FIG. 2 is a schematic block diagram illustrating on embodiment of a control arrangement of an ink jet printer incorporating the present invention.

The printer 12, therefore, of the present invention, includes a control system incorporating the present invention and a method of operation therefore. As shown in FIG. 2, a controller or central processing unit (CPU) 40 is connected through a bus 42 to an interface 44 which, in turn, is connected to an external device such as the personal computer 26. The personal computer 26 provides information in the form of an input digital gray scale or an input digital color image (bitmap) to the printer for printing. The CPU 40 is also connected to a read only memory (ROM) 46 which includes an operating program for the CPU 40 as well as printing algorithms for manipulating print data, such as an error diffusion algorithm. One such error diffusion algorithm is described in U.S. Pat. No. 5,045,952, herein incorporated by reference. A random access memory (RAM) 48, connected to the bus 42, includes accessible memory including print buffers for the manipulation of data and for the storage of printing information in the form of bitmaps received from the host computer. In addition to the ROM 46 and the RAM 48, various printer control circuits 50 are also connected to the bus 42 for operation of the printing apparatus which includes paper feed driver circuits as is known by those skilled in the art.

The controller 40 is programmed according to well known practices. It is commonplace to program and execute control functions and logic with software instructions for conventional or general purpose microprocessors. This is taught by various prior patents and commercial products. Such programming or software may, of course, vary depending on the particular functions, software type, and microprocessor or other computer system utilized but will be available to, or readily programmable, without undue experimentation from, functional descriptions, such as those provided herein, or prior knowledge of functions which are conventional, together with general knowledge in the software and computer arts. That can include object oriented software development environments, such as C++. Alternatively, the disclosed system or method may be implemented partially or fully in hardware, using standard logic circuits or a single chip using VLSI designs.

The printheads 14, 15, 16, and 17 are controlled by the central processing unit 40 according to the content of signals received over the bus 42 and sent to various printhead control circuits 52. The printhead control circuits 52 control the thermal transducers for ejection of inks from the nozzles 23 of a printhead 54 incorporating an aspect of the present invention. A suitable controller for an ink jet printing apparatus is described in U.S. Pat. No. 5,300,968 to Hawkins, which is herein incorporated by reference.

It has been found that while error diffusion algorithms can be useful in generating binary images from input digital gray-scale images, error diffusion algorithms do not always produce acceptable images for ink jet printers. Ink jet printers can have difficulty with the black level or color level of prints due to paper/ink interactions or printheads that simply generate out of specification sized ink drops thereby producing images on the recording medium which do not have the appropriate contrast or color content. It has been found that by modifying the error diffusion algorithm, an adjustment for maintaining the proper black level or color level of a printed image can be accomplished.

The printhead 54, therefore, includes a spot size signature file 56 stored in a memory element resident on the printhead. The spot size signature file 56 contains information which includes the ink ejecting characteristics for one or more of the ink ejecting orifices of the printhead or for individual printhead dies. This information is used to correct for the undesired image defects resulting from the use of error diffusion algorithms in liquid ink printers.

In the known error diffusion algorithms, the error is the difference between the gray value (0–255) of the original input digital gray scale image and the actual value which is printed, white (0) or black (255). Since, in ink jet printing, the spots or pixels are typically separated from one another, rather than grouped together, the known error diffusion algorithms are typically more sensitive to changes in the spot size of an ink jet drop. Consequently, by determining the size of drops generated by the printhead 54 and comparing the size of the generated drops to the desired or nominal sized drops, an adjustment factor can be determined which is then used to modify error diffusion algorithms to compensate for the oversize spots. The present invention therefore applies to error diffusion algorithms where errors are distributed or diffused.

For the present invention, the standard error diffusion algorithm, which is expressed with two equations, is modified by a calculated correction factor or compensating factor, C. The first equation (Equation 1) is not modified where the output image pixels, b (m,n), defined as:

$$b(m,n) = \text{step } [i(m,n) - \Sigma a_{jk} e(m-j, n-k) - t] \quad \text{(Equation 1)}$$

where i equals the image input pixel. The second equation (Equation 2) is modified by the addition of a correction factor C, where e(m,n) describes the errors made in the thresholding process, as follows:

$$e(m,n) = b(m,n) - [i(m,n) - \Sigma a_{jk} e(m-j, n-k)] + C(b(m,n)) \quad \text{(Equation 2)}$$

For the present invention, equation 2 is modified by adding the correction factor, C, or C(b(m,n)) where:

$$C(b(m,n)) = 0 \text{ when } b(m,n) \text{ is white}$$

and $$C(b(m,n)) = c \text{ when } b(m,n) \text{ is black}$$

where the compensating factor, c, is selected to compensate for the size or area of a spot. For instance, c is proportional to the extra area of the spot when compared to a nominal spot size. As an example, if the spot diameter of a spot is nominally 130 microns but in reality is 150 microns, the area of coverage is about 33 percent too large. Such a difference in spot size typically causes unacceptable prints for the user. This added dark value, due to the extra size of the spot, can be compensated for, however, to a good approximation, by adding an adjustment factor of 33 percent so that rather than the black error being 255-gray, it becomes 84.5+255-gray (84.5=0.33×255) where gray is the actual value of the pixel.

Figure 4:
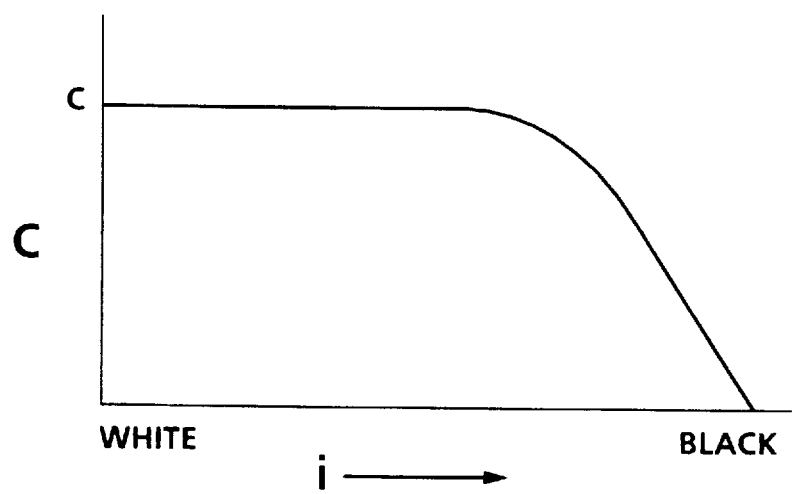
FIG. 4 illustrates a plot of a correction factor C, determined according to the gray level of an input pixel.

In addition, it should be noted that the adjustment factor should not be made for text, otherwise text, which is typically all black, might develop ragged edges if certain pixels are left out. This can be done by handling text and images separately. It can also be done by making C a function of the input pixel i(m,n) as well, as illustrated in FIG. 4. As shown, C is selected as a function of both the input pixel i as well as the output image pixel b such that c(b(m,n)), i(m,n)) is equal to 0 if i is near black or is equal to the linear extrapolation from 0-C for some value of i or is equal to C for most of i. In this way, C is not only chosen to compensate for the extra size of the printed spots but is also chosen to compensate for the image input pixels.

In addition to C being a function of spot size, C can also be determined as a function of spot size and printhead temperature. Since spot size changes with temperature, it is possible that by determining the temperature of the printhead dies an accurate determination of spot size and therefore the correction factor C could be made. Actual temperatures could be measured at each printhead die or temperatures could be predicted and modeled by counting the number of pixels printed and calculating temperatures accordingly. Ambient humidity can also be taken into account since humidity can affect spot size as well.

The signature file 56 can be generated in a number of ways and can include information representing different characteristics of the printhead. In one method of operation, the printheads print a test pattern consisting of a number of square test patches wherein the square test patches are of a size corresponding to the width of an image printed by the entire number of ink ejecting nozzles within a single printhead die. Each of the square test patches are then scanned by a scanner or densitometer to determine the gray level of the individual squares. Such a test pattern is useful, since it has been found that the nozzles within a printhead die typically generate ink drops of the same size, but that the nozzles from die to die are more likely to vary therefore generating an image defect which is noticeable. By generating square test patches, the overall effect of spot size printed by nozzles of individual printhead dies is therefore determined.

The resulting generated signature file includes a single correction factor, C, for each of the printhead dies and which is applied to each of the individual nozzles within a single printhead die. The generated signature file is then stored into the memory device which is present on the printhead such that when the printhead is installed in the printer, the information stored in the memory device can be used by the controller of the printer to modify the error diffusion algorithm to print binary images corrected for spot size. Such a signature file could consist of a lookup table which is used by the error diffusion algorithm to determine the amount of adjustment for each die. The printing algorithm would then select the adjustment factor from the signature file depending on which die is printing. The error diffusion algorithm then determines which spots of the binary image should be printed. The printer controller, using this information, generates signals which are used to energize the thermal transducers for printing the binary image.

While it is likely that testing drop volumes for each individual ink ejecting orifice on the entire printbar might be costly to warrant generating a correction factor for each nozzle, there may be some situations in which the signature file or adjustment file may be adjusted to include correction factors related to a single ink jet nozzle. For example, the ink ejecting nozzles located at either end of an array of ink ejecting nozzles within a single printhead die might yield different drop volumes (typically smaller) than the remaining nozzles, so it might be desirable to determine a different correction factor for these nozzles. In addition, it might be possible to hide butting errors by selectively changing the frequency of dots associated with the ink jets. Similarly, in an ink jet scanning cartridge product it might be possible to control the frequency of printing of the jets to hide printhead advance errors.

It is also possible, that the printer could be made self compensating such that a scanner, incorporated into the printer or externally connected through the interface 44, could be used to compensate for changes that might occur during the life of the printer. In such a printer, a signature file 58 would be generated and include correction factors stored in a dedicated memory device or, more likely, stored in the RAM 48.

In addition, since it has been shown that it is possible to adjust the gray level of ink jet images printed with the modified error diffusion algorithm, it is also possible that a user can control the contrast level of the images being printed by the use of a contrast controller 60 as illustrated in FIG. 2. The contrast controller 60 would be an input device to the printer such as an adjustable contrast control knob, movable from a first position to a second position, and a proper interface for the CPU 40. A generated contrast control signal would adjust the value of the compensating factor, C, such that the desired contrast for a particular image can be generated. The contrast control 60, might therefore, allow for the compensation of a printhead which consistently generates oversized drops, for instance, resulting from environmental conditions such as excessive ambient temperatures. It may also be desirable to adjust contrast to compensate for the particular recording medium being used.

Figure 3:
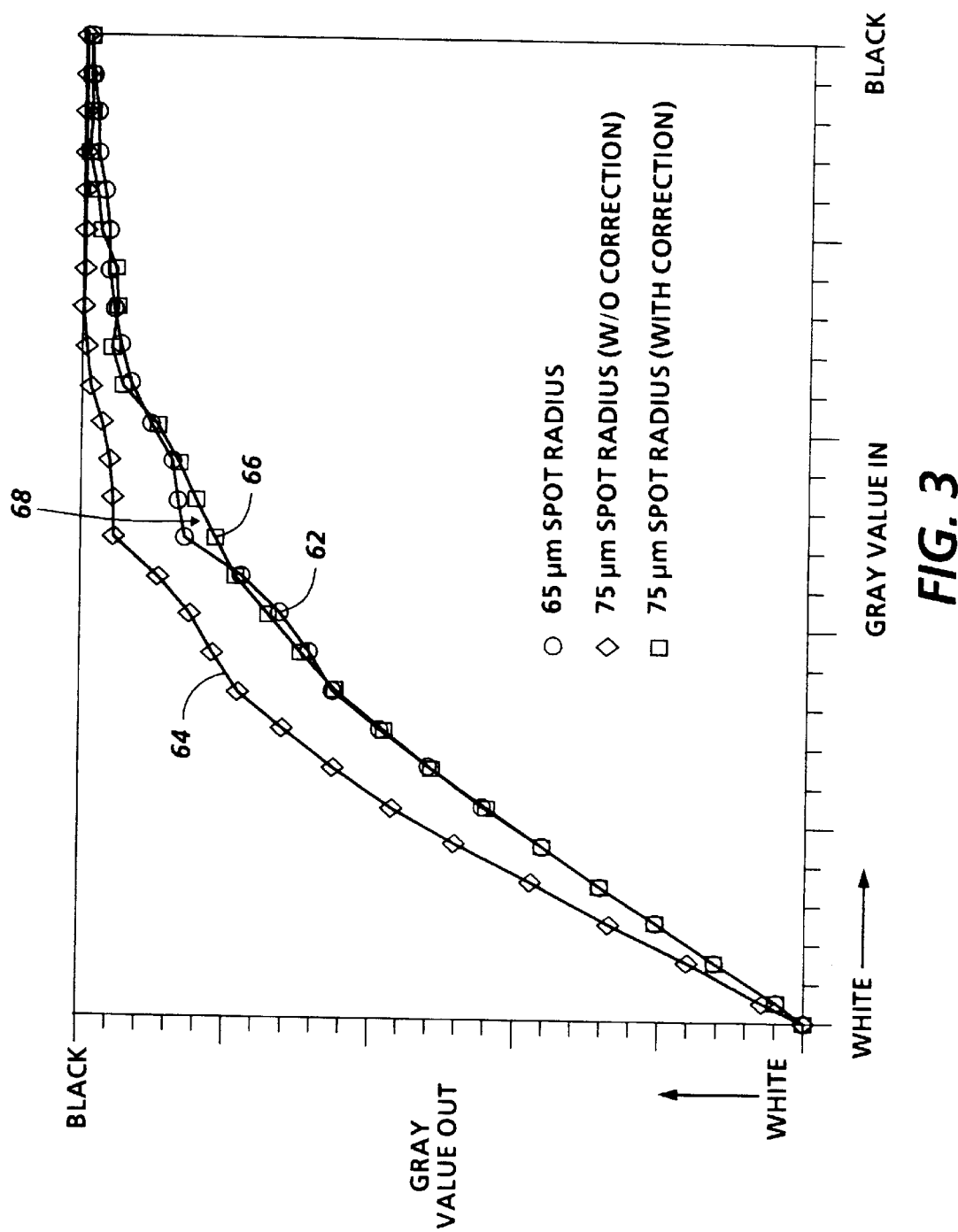
FIG. 3 illustrates a plot of tone reproduction curves (trc) for the present invention.

FIG. 3 shows the results of an image simulation using the present invention. As illustrated, three tone reproduction curves (trc) were created which demonstrate the improvement in printing when using the present invention. A trc curve 62 (circles) is the trc curve for a nominal 65 micron radius spot size. A curve 64 (diamonds) is a trc curve that results from an oversized 75 micron radius drop size. As can be seen, the difference between the 65 micron spot size and the 75 micron spot size is noticeable and consequently would be noticeable to a customer. A curve 66 is the trc curve generated with the larger 75 micron spot size but using a 33% correction factor to modify the error diffusion algorithm since the 75 micron radius spot size is approximately 33% greater than the 65 micron radius spot size. As can be seen, the modification according to the present invention to the error diffusion algorithm has returned the 75 micron spot size trc curve to that of the nominal spot size curve. In addition, the present invention provides for the correction of an error diffusion artifact 68 in the midtone region that is typically characteristic of images corrected by the known error diffusion algorithm. The present invention substantially removes this artifact and improves the overall print quality thereby.

The present invention is not, however, limited to the adjustment of the gray level of monochrome images only. The present invention, is equally applicable to the adjustment of color in the printing of color images. As is known in the art, the error diffusion algorithm which is typically applied to each of the color planes c, m, and y would therefore include an adjustment factor determined either before the printhead has been incorporated into the printer or after the printhead has been attached thereto as described and taught herein.

In recapitulation, there has been described a method and apparatus for adjusting the black level and color of images printed by a liquid ink printer. It will no doubt be appreciated that the present invention can therefore be accomplished with a hardware logic implementation, a software implementation on a programmable processing device or a combination of hardware and software. It is, therefore, apparent that there has been provided in accordance with the present invention, a method of printing an input digital gray-scale image by forming a plurality of spots on a recording medium. A correction factor is calculated based on the spot characteristics and is used to modify an error diffusion algorithm such that the printed binary image accurately reflects the gray scale level or color level of the input digital gray scale image. The present invention is not limited to pagewidth printheads or full width array printheads, but is equally applicable to all liquid ink printheads of any resolution and size, including partial width array printheads and scanning printheads. In addition, the present invention is equally applicable to any printer printing spots, including xerographic printers. Accordingly, it is intended to embrace all such alternatives, modifications and variations that fall within the spirit and broad scope of the appended claims.

What is claimed is:

1. A method of preparing a plurality of multi-level greyscale pixels representing a digital image for reproduction on an output device, comprising the steps of:
   (a) determining a spot characteristic of a reproduction process of the output device;
   (b) converting a multi-level greyscale pixel to a level which can be reproduced by the output device;
   (c) generating an error value from the conversion process of said step (b);
   (d) modifying the error value of said step (c) as a function of the determined spot characteristic; and
   (e) diffusing the modified error value to a plurality of multi-level greyscale pixels adjacent to the pixel being converted by said step (b).

2. The method as claimed in claim 1, wherein said step (a) determines the spot characteristic by determining a difference between a nominal spot size of the output device and an actual spot size of the output device.

3. The method as claimed in claim 1 wherein said step (a) determines a spot characteristic by determining a difference between a nominal spot size of the output device and an actual spot size of the output device and a temperature of a printhead of the output device.

4. The method as claimed in claim 1, further comprising:
   (f) determining an image type of a pixel to be converted by said step (b);
   said step (a) determining a spot characteristic as a function of a difference between a nominal spot size of the output device and an actual spot size of the output device and an image type of the pixel to be converted.

5. The method as claimed in claim 1 wherein said step (a) determines a spot characteristic by determining a difference between a nominal spot size of the output device and an actual spot size of the output device and an ambient humidity surrounding of the output device.

6. The method as claimed in claim 1 wherein said step (a) determines a spot characteristic by determining a difference between a nominal spot size of the output device and an actual spot size of the output device, a temperature of a printhead of the output device, and an ambient humidity surrounding of the output device.

7. The method as claimed in claim 1, further comprising:
   (f) determining an image type of a pixel to be converted by said step (b);
   said step (a) determining a spot characteristic as a function of a difference between a nominal spot size of the output device and an actual spot size of the output device, an image type of the pixel to be converted, and a temperature of a printhead of the output device.

8. The method as claimed in claim 1, further comprising:
   (f) determining an image type of a pixel to be converted by said step (b);
   said step (a) determining a spot characteristic as a function of a difference between a nominal spot size of the output device, an actual spot size of the output device, an image type of the pixel to be converted, and an ambient humidity surrounding of the output device.

9. The method as claimed in claim 1, further comprising:
   (f) determining an image type of a pixel to be converted by said step (b);
   said step (a) determining a spot characteristic as a function of a difference between a nominal spot size of the output device and an actual spot size of the output device, an image type of the pixel to be converted, a temperature of a printhead of the output device, and an ambient humidity surrounding of the output device.

10. A method of preparing a plurality of multi-level greyscale pixels representing a digital image to be printed with a liquid ink printhead including a plurality of printhead dies, comprising the steps of:

(a) determining a characteristic signature, representative of a formed spot, for a printhead die;

(b) converting a multi-level greyscale pixel to a level which can be reproduced by the output device;

(c) generating an error value from the conversion process of said step (b);

(d) modifying the error value of said step (c) as a function of the determined characteristic signature; and (e) diffusing the modified error value to a plurality of multi-level greyscale pixels adjacent to the pixel being converted by said step (b).

* * * * *